(12) United States Patent
Fuse

(10) Patent No.: US 12,067,088 B2
(45) Date of Patent: Aug. 20, 2024

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Hiroshi Fuse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 17/360,940

(22) Filed: Jun. 28, 2021

(65) Prior Publication Data

US 2022/0004602 A1    Jan. 6, 2022

(30) Foreign Application Priority Data

Jul. 1, 2020  (JP) ................................. 2020-114216

(51) Int. Cl.
*G06F 21/10* (2013.01)
(52) U.S. Cl.
CPC ........ *G06F 21/105* (2013.01); *G06F 21/1073* (2023.08)
(58) Field of Classification Search
CPC .............. G06F 21/105; G06F 21/1073; G06F 9/44542; G06F 8/65; G06F 21/51; G06F 9/451; G06F 3/12; G06F 21/57; G06F 2221/0766
See application file for complete search history.

(56) References Cited

U.S. PATENT DOCUMENTS

| | | | | |
|---|---|---|---|---|
| 6,438,230 B1 * | 8/2002 | Moore | ................. | H04L 9/0618 380/42 |
| 7,653,001 B2 * | 1/2010 | Agrawal | ................. | H04L 67/56 370/252 |
| 8,281,232 B2 * | 10/2012 | Vishria | ............... | G06F 16/9566 715/208 |
| 8,589,306 B1 * | 11/2013 | Morriss | ................ | G06Q 50/184 705/1.1 |
| 9,008,651 B2 * | 4/2015 | Kun-Szabo | ....... | H04M 1/72445 455/414.1 |
| 9,010,622 B2 * | 4/2015 | Kim | ..................... | G06F 16/9554 235/375 |
| 9,065,819 B1 * | 6/2015 | Shanmugam | ........... | G06F 21/41 |
| 9,106,642 B1 * | 8/2015 | Bhimanaik | ......... | H04L 63/0807 |

(Continued)

FOREIGN PATENT DOCUMENTS

CN          101964031 A       2/2011
CN          108471482 A       8/2018

(Continued)

*Primary Examiner* — David Garcia Cervetti
(74) *Attorney, Agent, or Firm* — Canon U.S.A., Inc. IP Division

(57) ABSTRACT

A method for an information processing apparatus in which a hybrid application having both a function of a native application and a function of a web application operates and that is communicable with a server, the method includes transmitting, upon acceptance of a predetermined user operation, an acquisition request for information about the web application to the server, reading information about the native application saved in advance in the hybrid application, and displaying information generated from the acquired information as a response to the acquisition request and the read information, as a result of the predetermined user operation.

13 Claims, 9 Drawing Sheets

(56) References Cited

U.S. PATENT DOCUMENTS

| | | | |
|---|---|---|---|
| 9,203,874 B2* | 12/2015 | Kadishay | H04L 65/1093 |
| 9,578,186 B2* | 2/2017 | Kusaka | G06F 3/041 |
| 9,788,219 B1* | 10/2017 | Michel | H04L 63/04 |
| 9,883,234 B2* | 1/2018 | Coburn, IV | G11B 19/025 |
| 9,886,272 B1* | 2/2018 | Zhou | G06F 8/76 |
| 10,026,108 B2* | 7/2018 | Jackson | H04L 67/75 |
| 10,031,678 B2* | 7/2018 | Jeong | G06F 3/0658 |
| 10,284,369 B2* | 5/2019 | Wagner | H04L 9/0822 |
| 10,305,918 B1* | 5/2019 | Shirley | H04L 63/1466 |
| 10,476,831 B2* | 11/2019 | Thomson | H04L 67/54 |
| 10,747,852 B1* | 8/2020 | Dalessio | G06F 8/71 |
| 11,006,187 B2* | 5/2021 | Ryu | H04N 21/8586 |
| 11,218,367 B2* | 1/2022 | McEntee | G06F 21/6218 |
| 11,592,906 B2* | 2/2023 | Monnerat | G06F 3/1423 |
| 2001/0016873 A1* | 8/2001 | Ohkado | G06F 16/958 707/E17.116 |
| 2003/0091192 A1* | 5/2003 | Chen | H04L 63/0457 380/277 |
| 2004/0071293 A1* | 4/2004 | Yamamichi | H04L 9/3093 380/277 |
| 2004/0181490 A1* | 9/2004 | Gordon | G06F 21/10 705/59 |
| 2005/0080880 A1 | 4/2005 | Von Tetzchner et al. | |
| 2005/0120211 A1* | 6/2005 | Yokoyama | G06F 21/335 713/168 |
| 2007/0107067 A1* | 5/2007 | Fountian | G06F 8/60 726/33 |
| 2007/0157072 A1* | 7/2007 | LaBiche | G11B 27/322 707/E17.112 |
| 2007/0230692 A1* | 10/2007 | Akiyama | H04L 9/3026 380/44 |
| 2008/0209214 A1* | 8/2008 | Schrijen | H04L 9/3242 713/169 |
| 2008/0244754 A1* | 10/2008 | Curren | G06F 21/10 726/27 |
| 2008/0301444 A1* | 12/2008 | Kim | H04L 63/126 713/169 |
| 2009/0037287 A1* | 2/2009 | Baitalmal | G06F 21/128 705/27.1 |
| 2009/0037337 A1* | 2/2009 | Baitalmal | G06Q 99/00 705/59 |
| 2009/0037452 A1* | 2/2009 | Baitalmal | G06F 16/27 |
| 2009/0037492 A1* | 2/2009 | Baitalmal | G06F 16/27 |
| 2009/0119602 A1* | 5/2009 | Nishiyama | H04L 63/08 715/753 |
| 2009/0185680 A1* | 7/2009 | Akiyama | H04L 9/3093 380/30 |
| 2010/0005517 A1* | 1/2010 | Foti | H04N 21/25875 726/6 |
| 2010/0030868 A1* | 2/2010 | Okamoto | H04N 21/435 715/764 |
| 2010/0146597 A1* | 6/2010 | Tanaka | G06F 16/958 709/219 |
| 2010/0226496 A1* | 9/2010 | Akiyama | H04L 9/3093 380/28 |
| 2010/0228989 A1* | 9/2010 | Neystadt | G06F 21/6209 713/185 |
| 2011/0055329 A1* | 3/2011 | Abt, Jr. | G06F 16/958 709/205 |
| 2011/0103583 A1* | 5/2011 | Yoon | H04L 9/3093 380/255 |
| 2012/0166655 A1* | 6/2012 | Maddali | H04L 67/02 709/228 |
| 2012/0210379 A1* | 8/2012 | McCoy | H04N 21/64322 725/109 |
| 2012/0284176 A1* | 11/2012 | Svendsen | G11B 27/031 715/753 |
| 2013/0089192 A1* | 4/2013 | Citron | H04M 7/0027 379/93.17 |
| 2013/0125185 A1* | 5/2013 | Jana | H04N 21/2668 725/109 |
| 2013/0173754 A1* | 7/2013 | van Os | H04L 67/02 709/219 |
| 2013/0196590 A1* | 8/2013 | Fyke | H04W 8/24 455/3.01 |
| 2013/0283298 A1* | 10/2013 | Ali | G06F 9/5077 719/319 |
| 2014/0032350 A1* | 1/2014 | Biswas | G06Q 30/06 709/219 |
| 2014/0047517 A1 | 2/2014 | Ding et al. | |
| 2014/0095589 A1* | 4/2014 | Johnson | G06F 9/547 709/203 |
| 2014/0113602 A1* | 4/2014 | Six | H04L 65/70 455/414.4 |
| 2014/0123033 A1* | 5/2014 | Uhma | G06F 16/972 715/753 |
| 2014/0143672 A1* | 5/2014 | Kim | G06F 3/0483 715/733 |
| 2014/0170978 A1* | 6/2014 | Wolman | G06F 3/1454 455/41.2 |
| 2014/0189479 A1* | 7/2014 | Glennon | G06F 16/958 715/205 |
| 2014/0207566 A1* | 7/2014 | Kamran | H04L 67/1095 705/14.55 |
| 2014/0245185 A1* | 8/2014 | Knodt | H04L 65/4046 715/753 |
| 2014/0279123 A1* | 9/2014 | Harkey | G06Q 30/0619 705/26.1 |
| 2014/0282119 A1* | 9/2014 | Wouhaybi | G06F 3/04883 715/760 |
| 2014/0325470 A1* | 10/2014 | Padmavilasom | H04L 67/565 717/100 |
| 2014/0364092 A1* | 12/2014 | Rose | G06F 16/433 455/414.1 |
| 2015/0046708 A1* | 2/2015 | Yasuda | H04L 9/3093 713/168 |
| 2015/0082239 A1* | 3/2015 | Zhao | H04L 67/565 715/788 |
| 2015/0134534 A1* | 5/2015 | Lai | G06Q 50/184 705/59 |
| 2015/0135198 A1* | 5/2015 | Pack, III | G06F 9/542 719/318 |
| 2015/0143442 A1* | 5/2015 | McCoy | H04N 21/4122 725/110 |
| 2015/0149777 A1* | 5/2015 | Kim | H04W 12/069 713/169 |
| 2015/0200936 A1* | 7/2015 | Kim | H04L 63/0853 713/171 |
| 2015/0213238 A1* | 7/2015 | Farha | G06F 21/34 726/30 |
| 2015/0222615 A1* | 8/2015 | Allain | H04L 67/55 726/4 |
| 2015/0256352 A1* | 9/2015 | Yang | H04L 67/147 715/753 |
| 2015/0270967 A1* | 9/2015 | Susella | H04L 9/003 380/30 |
| 2015/0280914 A1* | 10/2015 | Yasuda | H04L 9/14 380/30 |
| 2015/0318991 A1* | 11/2015 | Yasuda | H04L 9/3093 380/28 |
| 2016/0044122 A1* | 2/2016 | Sandholm | H04W 4/06 709/206 |
| 2016/0066184 A1* | 3/2016 | Bhargav-Spantzel | H04L 63/105 726/7 |
| 2016/0072801 A1* | 3/2016 | Cao | H04L 9/0866 713/186 |
| 2016/0080333 A1* | 3/2016 | Isshiki | H04L 9/3093 713/168 |
| 2016/0142511 A1* | 5/2016 | Smith | G06Q 30/06 709/223 |
| 2016/0149918 A1* | 5/2016 | Chai | G06Q 40/00 726/4 |
| 2016/0156570 A1* | 6/2016 | Mori | G06Q 10/1095 709/204 |
| 2016/0173275 A1* | 6/2016 | Yasuda | H04L 9/14 380/28 |

(56) References Cited

U.S. PATENT DOCUMENTS

| | | | |
|---|---|---|---|
| 2016/0191621 A1* | 6/2016 | Oh | H04L 67/1095 |
| | | | 709/205 |
| 2016/0197726 A1* | 7/2016 | Yasuda | H04L 9/14 |
| | | | 380/28 |
| 2016/0202972 A1* | 7/2016 | Sass | G06F 8/75 |
| | | | 717/121 |
| 2016/0212178 A1* | 7/2016 | Zhang | H04L 65/403 |
| 2016/0224335 A1* | 8/2016 | Zhou | G06F 9/44505 |
| 2016/0224336 A1* | 8/2016 | Zhou | G06F 9/44521 |
| 2016/0241609 A1* | 8/2016 | Xin | G06F 3/0484 |
| 2016/0269174 A1* | 9/2016 | Yasuda | H04L 9/008 |
| 2016/0294905 A1* | 10/2016 | Agro | H04N 21/6547 |
| 2016/0316032 A1* | 10/2016 | Brunn | H04W 4/21 |
| 2016/0330574 A1* | 11/2016 | Wuts | H04W 76/15 |
| 2016/0350552 A1* | 12/2016 | Matsuzaki | G06F 16/9535 |
| 2016/0350648 A1* | 12/2016 | Gilad-Bachrach | G06N 3/08 |
| 2016/0352510 A1* | 12/2016 | Morikawa | G09C 1/00 |
| 2016/0352710 A1* | 12/2016 | Hibshoosh | H04L 63/061 |
| 2017/0017386 A1* | 1/2017 | Mattson | G06F 16/957 |
| 2017/0032378 A1* | 2/2017 | Ciszewski | G06Q 30/018 |
| 2017/0078343 A1* | 3/2017 | Qiu | H04L 67/561 |
| 2017/0083487 A1* | 3/2017 | Wang | G06F 40/117 |
| 2017/0090950 A1* | 3/2017 | Sakamoto | G06F 16/986 |
| 2017/0099263 A1* | 4/2017 | Matsuzaki | H04L 67/12 |
| 2017/0131855 A1* | 5/2017 | Svendsen | H04N 21/47205 |
| 2017/0171285 A1* | 6/2017 | Shu | G06F 3/0485 |
| 2017/0178592 A1* | 6/2017 | Dow | G09G 5/12 |
| 2017/0180387 A1* | 6/2017 | Hayashi | H04L 63/102 |
| 2017/0201852 A1* | 7/2017 | Kuang | H04W 12/06 |
| 2017/0272244 A1* | 9/2017 | Garcia Morchon | H04L 9/0869 |
| 2017/0300314 A1 | 10/2017 | Lopyrev et al. | |
| 2017/0322762 A1* | 11/2017 | Duong | B43L 1/00 |
| 2017/0324559 A1* | 11/2017 | Hu | H04W 12/50 |
| 2017/0357783 A1* | 12/2017 | Rahn | G06F 21/105 |
| 2018/0011679 A1* | 1/2018 | Sugioka | G09G 5/006 |
| 2018/0015755 A1* | 1/2018 | Yamada | G06F 3/1292 |
| 2018/0034630 A1* | 2/2018 | Rietman | H04L 9/0869 |
| 2018/0039698 A1* | 2/2018 | Lewis | G06Q 10/10 |
| 2018/0039787 A1* | 2/2018 | Watariuchi | H04L 63/123 |
| 2018/0096248 A1* | 4/2018 | Chabanne | G06N 3/08 |
| 2018/0098028 A1* | 4/2018 | Mu | H04N 21/2187 |
| 2018/0196885 A1* | 7/2018 | Kim | G06F 16/9566 |
| 2018/0253148 A1* | 9/2018 | Santamaria | G06F 9/451 |
| 2019/0042924 A1* | 2/2019 | Pasca | G06F 7/548 |
| 2019/0065706 A1* | 2/2019 | Nishikawa | G06F 21/608 |
| 2019/0065707 A1* | 2/2019 | Nishikawa | G06F 21/608 |
| 2019/0065974 A1* | 2/2019 | Michigami | G06N 3/084 |
| 2019/0114365 A1* | 4/2019 | Liu | G06K 19/06037 |
| 2019/0121913 A1* | 4/2019 | Singh | G06F 16/9554 |
| 2019/0132654 A1* | 5/2019 | Hu | H04N 21/23418 |
| 2019/0182216 A1* | 6/2019 | Gulak | H04L 63/0414 |
| 2019/0265941 A1* | 8/2019 | Baba | G06F 16/955 |
| 2019/0278887 A1* | 9/2019 | Ramanujam | G06F 9/455 |
| 2019/0373316 A1* | 12/2019 | Yu | H04N 21/26216 |
| 2020/0043097 A1* | 2/2020 | Aznaurashvili | G06Q 50/265 |
| 2020/0074356 A1* | 3/2020 | Tseng | G06Q 20/045 |
| 2020/0134099 A1 | 4/2020 | Momchilov et al. | |
| 2020/0137143 A1* | 4/2020 | Sun | G06F 16/9566 |
| 2020/0142930 A1* | 5/2020 | Wang | G06F 18/23213 |
| 2020/0170057 A1* | 5/2020 | Rakshit | G06F 3/165 |
| 2020/0293178 A1* | 9/2020 | Kumar | H04L 67/02 |
| 2020/0304293 A1* | 9/2020 | Gama | G06F 17/16 |
| 2021/0092176 A1* | 3/2021 | Schneider | H04N 21/6587 |
| 2021/0097125 A1* | 4/2021 | Khanna | H04L 67/02 |
| 2021/0149997 A1* | 5/2021 | Sugita | G06T 1/0007 |

FOREIGN PATENT DOCUMENTS

| | | |
|---|---|---|
| JP | 5470500 B1 | 4/2014 |
| JP | 2016014920 A | 1/2016 |
| JP | 2016157282 A | 9/2016 |
| JP | 2018041240 A | 3/2018 |
| WO | 2005/031568 A1 | 4/2005 |
| WO | 2014178306 A1 | 11/2014 |

* cited by examiner

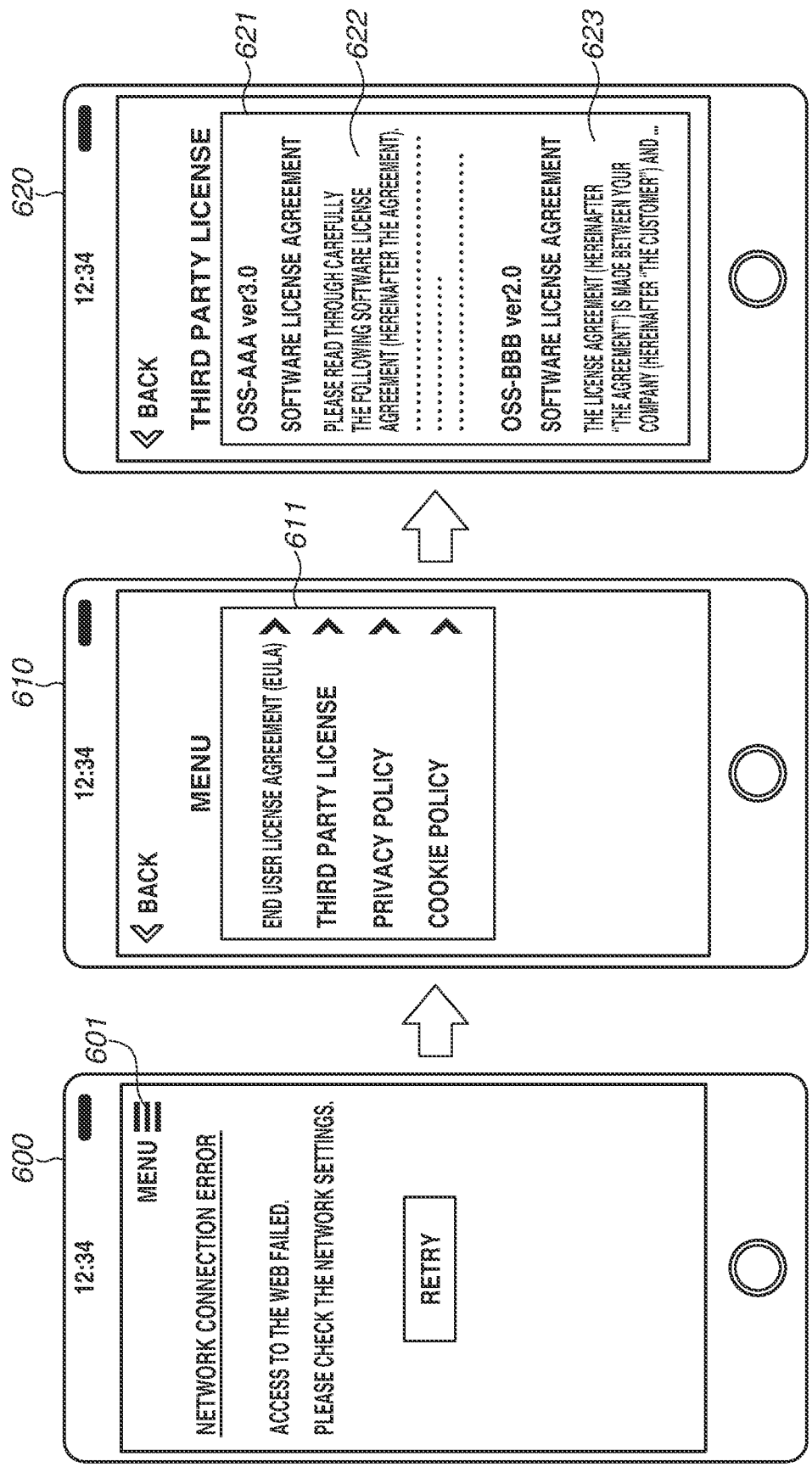

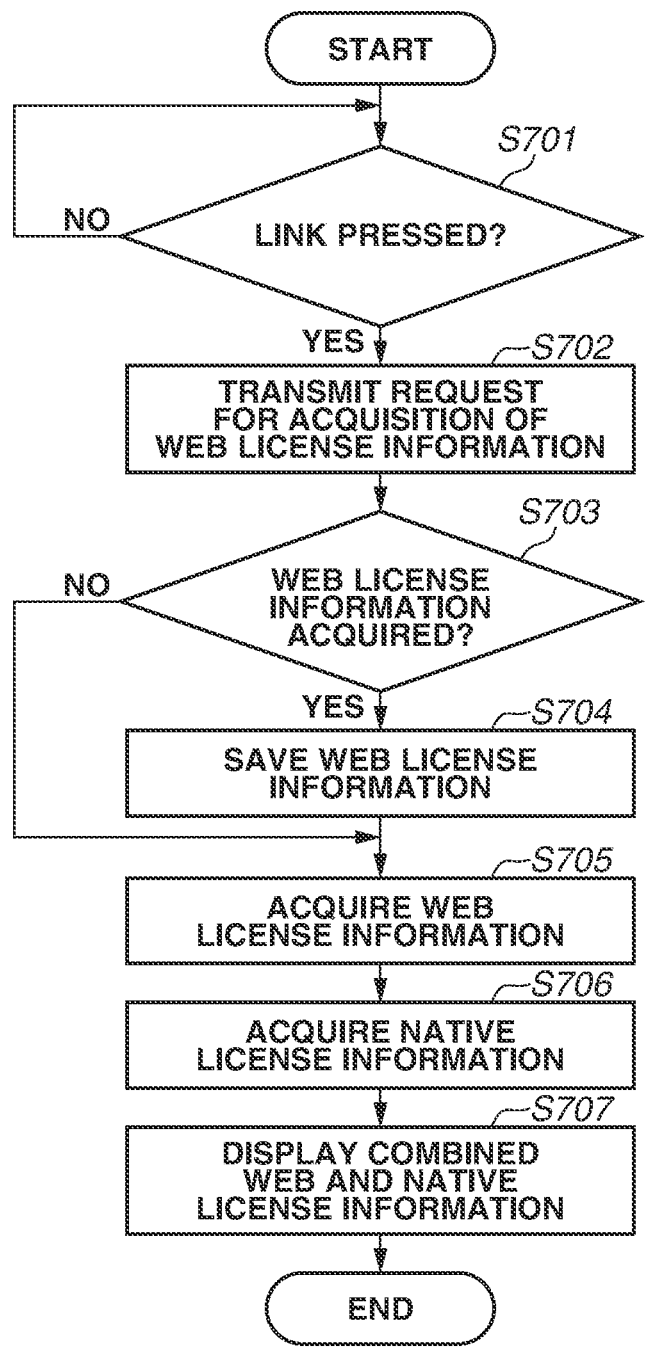

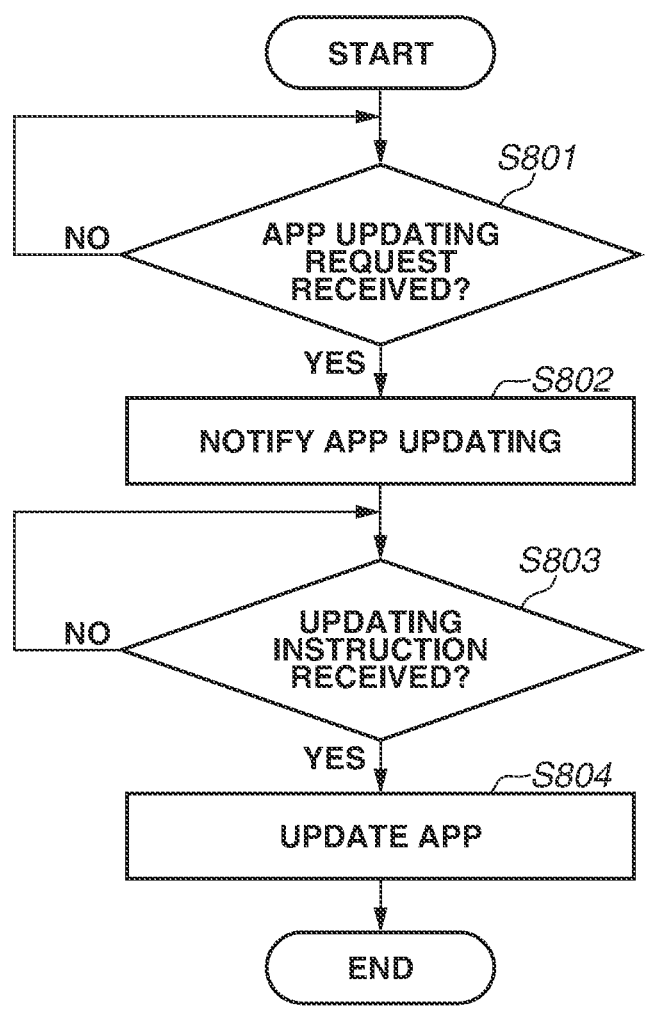

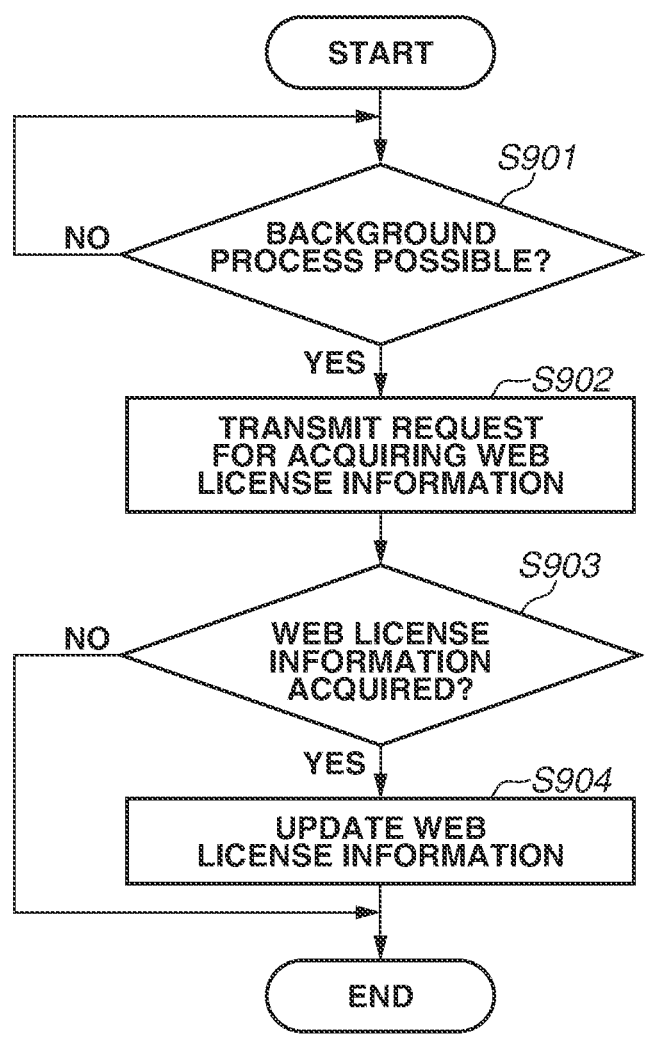

INFORMATION PROCESSING APPARATUS, STORAGE MEDIUM, AND CONTROL METHOD

BACKGROUND OF THE INVENTION

Field of the Invention

The present invention relates to an information processing apparatus, storage medium, and control method.

Description of the Related Art

In recent years, many business enterprises have developed their own products using open-source software (OSS). The use of OSS has advantages such as development cost reduction and application of state-of-the-art technology. Japanese Patent Application Laid-Open No. 2016-157282 describes a method for steadily fulfilling obligations involved in an OSS license. Software applications using OSS are obliged to display the text of the license (hereinafter, called license information) for a plurality of pieces of OSS used. Such software applications also need to present the contents of an agreement between a software developer and a purchaser, called end user license agreement (EULA). Thus, many applications (hereinafter abbreviated as apps) are configured to provide the license information and EULA from the menu or a help screen.

For example, OSS is widely used for development of mobile applications (hereinafter abbreviated as mobile apps) to be installed in a mobile terminal for expansion of the functions of the mobile terminal. After being installed in a mobile terminal, some mobile apps serve as "native apps" that operate without access to a web server, and others access a web server to execute "web apps" on the web server. In general, native apps save license information therein, and web apps save license information in a web server.

In recent years, hybrid mobile apps (hereinafter, abbreviated as hybrid apps) serving as both a native app and a web app have achieved widespread proliferation. Basically, hybrid apps normally operate when being communicable with a server providing resources, but some of hybrid apps can perform some of the functions even in a non-communicable state.

Taking OSS as an example, the hybrid app needs to allow display of both the license information about OSS used in the native app and the license information about OSS used in the web app. If the both pieces of license information are saved in the hybrid app as with the conventional native apps, it is necessary to update the mobile app in the mobile terminal for updating the license information not only in the event of a change of the OSS used in the native app but also in the event of a change of the OSS used in the web app. That is, the frequency with which the mobile app needs to be updated increases, which places the burden of development on the app providers and causes inconvenience to the users. On the other hand, if both pieces of license information are saved in the web server as with the conventional web apps, it is necessary to acquire both pieces of license information from the server each time the license information is to be displayed. This increases the communication volume, which may lead to a reduction in the speed of responses to user operations.

SUMMARY OF THE INVENTION

Thus, the present invention addresses providing a method for suitably displaying information about a native app and information about a web app without degrading user convenience.

According to an aspect of the present invention, a method for an information processing apparatus in which a hybrid application having both a function of a native application and a function of a web application operates and that is communicable with a server, the method includes transmitting, upon acceptance of a predetermined user operation, an acquisition request for information about the web application to the server, reading information about the native application saved in advance in the hybrid application, and displaying information generated in response to the acquisition request and the read information, as a result of the predetermined user operation.

Further features of the present invention will become apparent from the following description of exemplary embodiments with reference to the attached drawings.

BRIEF DESCRIPTION OF THE DRAWINGS

FIG. 6 is a diagram illustrating off-line screen transition of the mobile app.
FIG. 7 is a flowchart of a license display process in the mobile app.
FIG. 8 is a flowchart of an update process in the mobile app.
FIG. 9 is a flowchart of a background process in the mobile app.

DESCRIPTION OF THE EMBODIMENTS

Exemplary embodiments for carrying out the present invention will be described with reference to the drawings. It is noted that the exemplary embodiments described below do not limit the invention in the scope of the claims and that all of combinations of features described in relation to the exemplary embodiments are not necessarily essential to the solutions of the present invention.

System Configuration

Figure 1:
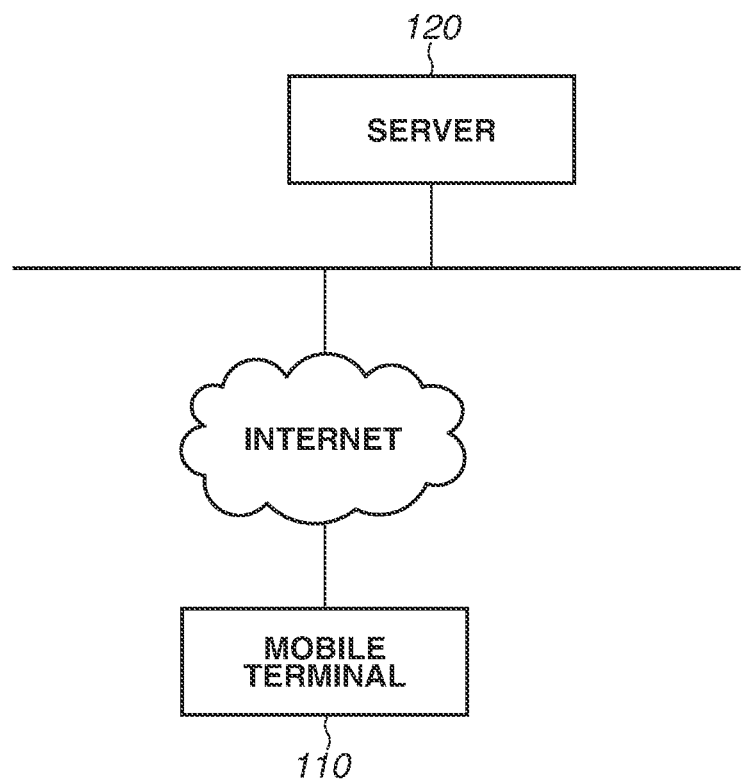
FIG. 1 is an overall view of a system.

FIG. 1 is a diagram illustrating an entire configuration of a system according to a first exemplary embodiment. An information processing system includes a mobile terminal 110 and a server 120. The mobile terminal 110 is communicably connected to the server 120 that provides various services on the Internet via a local area network (LAN) such as Wi-Fi® or a wide area network (WAN).

The mobile terminal 110, which for example may be a smartphone or tablet, has a plurality of functions such as telephone, mailer, web browser, and camera. The mobile terminal 110 is an example of information processing apparatus, which may be a personal computer (PC) or the like. The server 120 is an example of a server that has a function of saving files in various formats such as Hyper Text Markup Language (HTML) for describing web pages, JavaScript®, image, and text. The server 120 provides web pages and various types of information in response to requests from external terminals such as the mobile terminal 110.

The information processing system in the present exemplary embodiment is formed of the mobile terminal 110 and the server 120, but the information processing system is not limited to this structure.

Hardware Configuration of the Mobile Terminal

Figure 2:
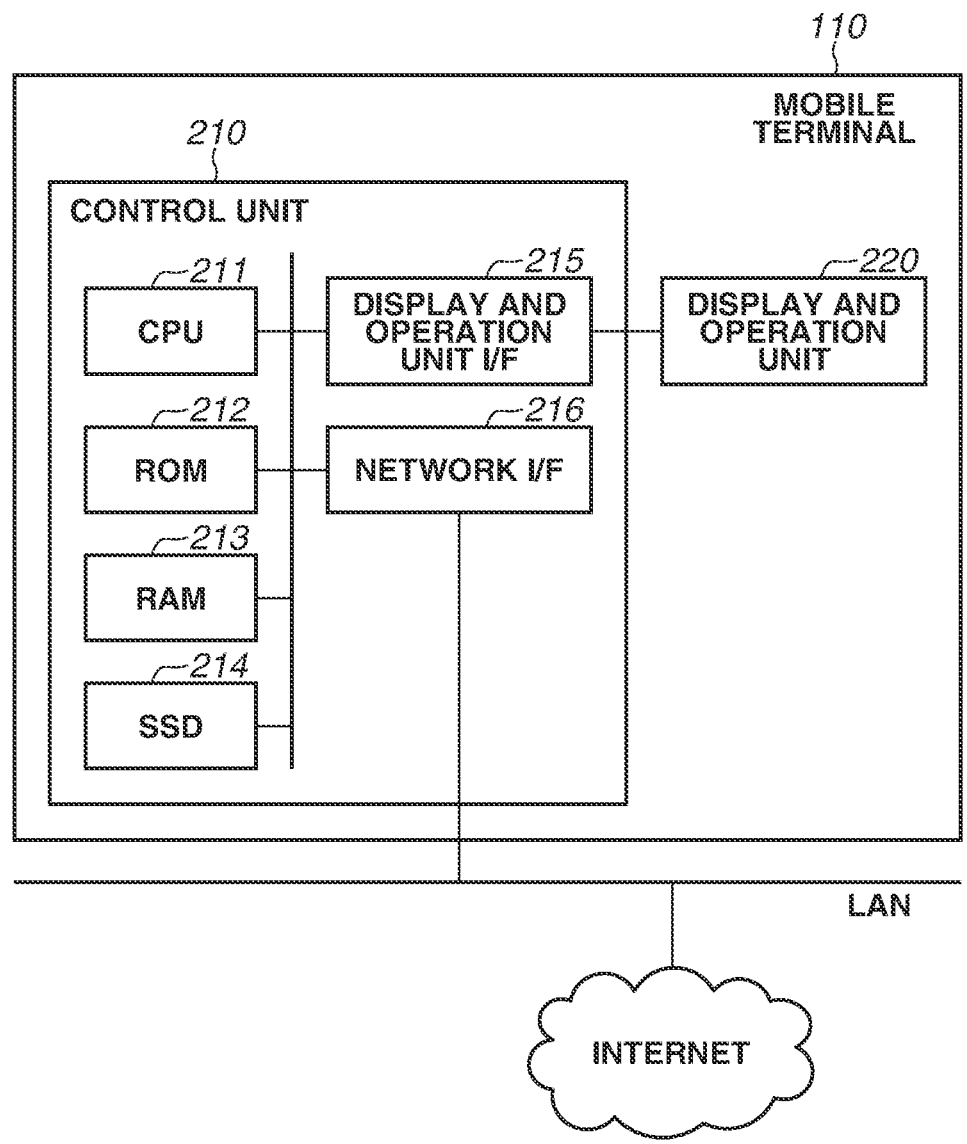
FIG. 2 is a hardware block diagram of a mobile terminal.

FIG. 2 is a hardware block diagram of the mobile terminal 110. The mobile terminal 110 includes a control unit 210 and a display and operation unit 220. The control unit 210 includes a central processing unit (CPU) 211, a read only memory (ROM) 212, a random access memory (RAM) 213, a solid state drive (SSD) 214, a display and operation unit interface (I/F) 215, and a network I/F 216 described below to control the operations of the entire mobile terminal 110. The CPU 211 reads control programs stored in the ROM 212 or the like to execute and control various functions of the mobile terminal 110 such as camera and communication. The RAM 213 is used as a temporary storage area such as the main memory or work area for the CPU 211. In the present exemplary embodiment, one CPU 211 uses one memory (the RAM 213 or the SSD 214) to execute processes described below with reference to the flowcharts, but the present invention is not limited to this. For example, a plurality of CPUs and a plurality of RAMs or SSDs may cooperate to execute the processes. The SSD 214 is a large-capacity storage unit that stores HTML files, JavaScript® files, image data, text data, various programs, and the like. The display and operation unit I/F 215 is an interface for connecting the display and operation unit 220 and the control unit 210. The display and operation unit 220 includes a touch panel display and hardware keys to accept operations, inputs, and instructions from the user or output screens to be presented to the user. The network I/F 216 is an interface for connecting the control unit 210 (of the mobile terminal 110) to a network such as a wireless LAN or WAN. The mobile terminal 110 uses the network OF 216 to transmit or receive various types of information such as images and texts to or from services on the Internet.

Hardware Configuration of the Server

Figure 3:
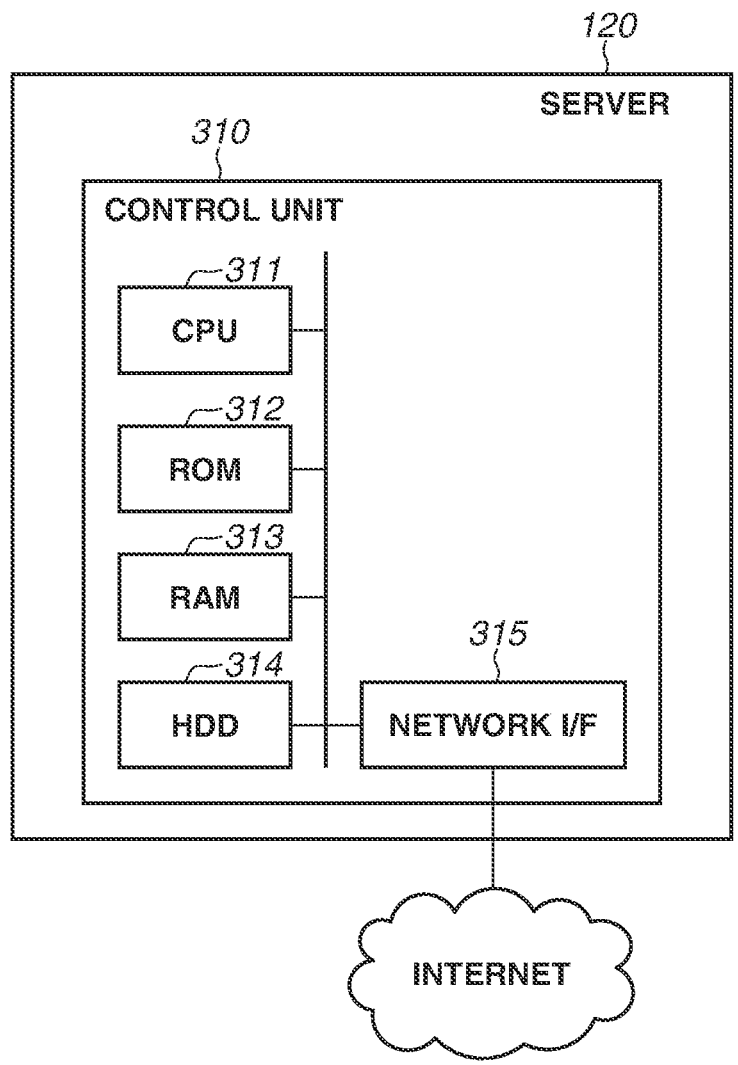
FIG. 3 is a hardware block diagram of a server.

FIG. 3 is a hardware block diagram of the server 120.

The server 120 includes a CPU 311, a ROM 312, a RAM 313, a hard disk drive (HDD) 314, and a network I/F 315. The CPU 311 reads control programs stored in the ROM 312 and executes various processes to control the entire operations. The RAM 313 is used as a temporary storage area such as the main memory or work area for the CPU 311. The HDD 314 is a large-capacity storage unit that stores HTML files, JavaScript® files, image data, text data, various programs, and the like. The network I/F 315 is an interface for connecting the server 120 to the Internet. The server 120 transmits or receives various types of information to or from another apparatus (such as the mobile terminal 110) via the network I/F 315 upon receipt of a processing request from the other apparatus.

Software Configuration of the Information Processing System

Figure 4:
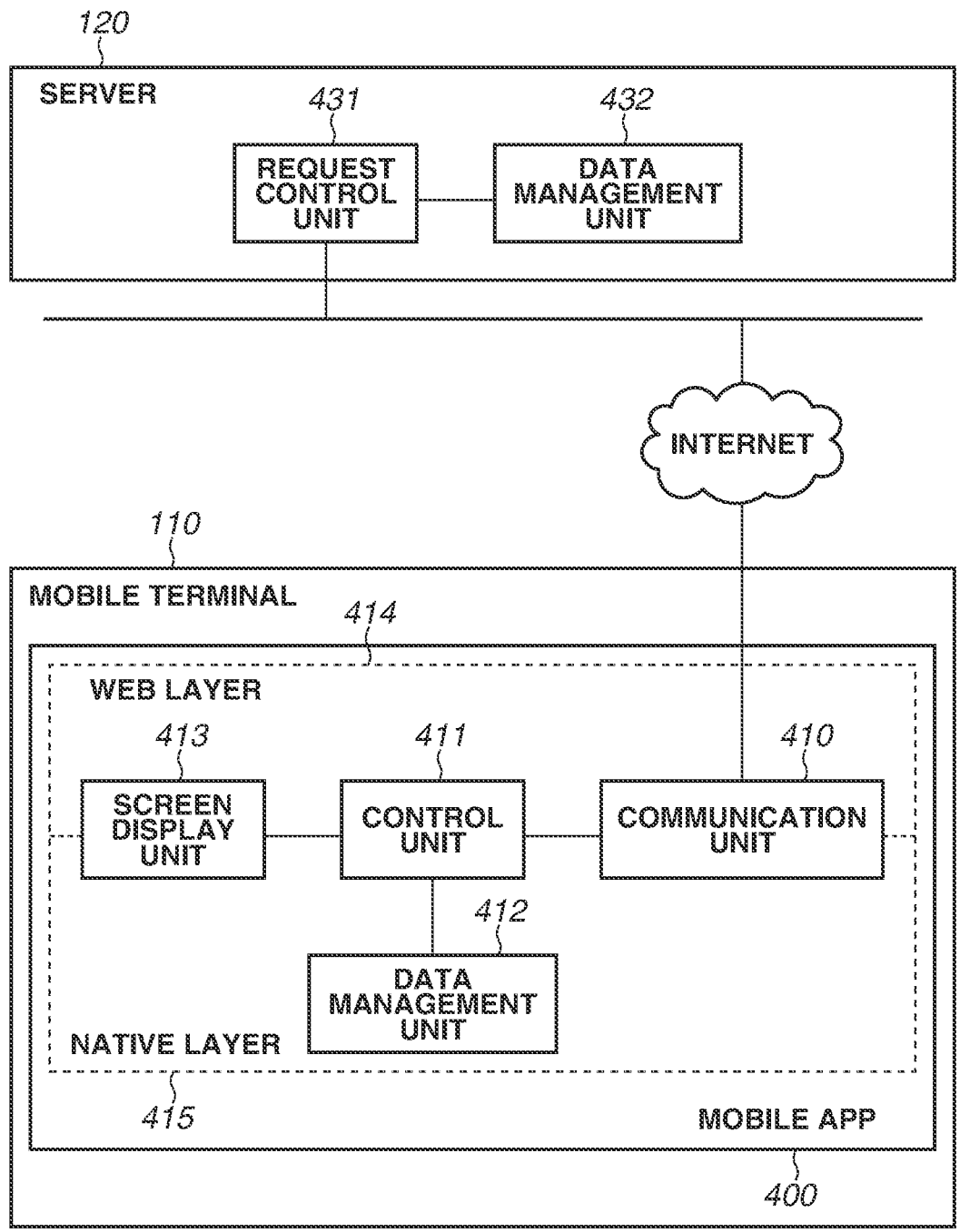
FIG. 4 is a software block diagram of the entire system.

FIG. 4 is a software block diagram of the information processing system according to the present exemplary embodiment. The functional units are implemented by the CPU 211 reading control programs stored in the ROM 212 or the SSD 214 or by the CPU 311 reading control programs stored in the ROM 312 or the HDD 314.

A mobile app 400 is an application installed on the mobile terminal 110 (hereinafter, the term application will be abbreviated as app). In general, some mobile apps serve as a native app, and others execute a web app held in a server. A native app operates with app screen information pre-installed on a mobile terminal and can execute functions (camera, access to files in the mobile terminal, and the like) specific to the mobile terminal. The native app can operate without connection of the mobile terminal to a network. On the other hand, to execute a web app, the mobile terminal accesses the server via a network each time to acquire the app screen information and the like, and displays the information on the web browser. The web app is based on web technology and is held in the server. In order to execute the web app, the mobile terminal needs to connect to a network and access the server. In addition, some mobile apps have a combination of both the function of a native app and the function of a web app (hereinafter called hybrid apps). A hybrid app contains a web layer where a web app is executed by accessing to the server and a native layer where functions specific to the mobile terminal, which cannot be processed in the web layer, are performed. The following description is based on the assumption that the mobile app 400 is a hybrid app that has a "native" layer and a "web" layer.

The mobile app 400 has a communication unit 410, a control unit 411, a data management unit 412, and a screen display unit 413, and is formed of a web layer 414 and a native layer 415. The communication unit 410, the control unit 411, and the screen display unit 413 are included in each of the web layer 414 and the native layer 415, and the data management unit 412 is included in the native layer 415. The functional units included in the layers are not limited to these units.

The communication unit 410 requests the server 120 to perform various processes. For example, in response to a request from the mobile app 400, the communication unit 410 transmits a request for screen layout information (HTML file, JavaScript® file, and the like) necessary for screen display to the server 120. The communication unit 410 also requests open source software (OSS) license information. The license information here includes the text of the license for OSS (text file or the like). The communication unit 410 uses a protocol such as Representational State Transfer (REST) or Simple Object Access Protocol (SOAP) to communicate with the server 120 but may use another means of communication.

The control unit 411 performs general control processes such as issuing a communication instruction, a screen display instruction, and a data management instruction, or executes a control method, in the mobile app 400. For example, at the time of startup of the mobile app 400, the control unit 411 acquires screen layout information from the server 120 via the communication unit 410, and issues a screen display instruction to the screen display unit 413 based on the screen layout information.

The data management unit 412 manages general information regarding the mobile app 400 such as end user license agreement (EULA) of the mobile app 400 and OSS license information. In the present exemplary embodiment, the data management unit 412 saves and manages in programs the text of the license for a plurality of pieces of OSS used in the native app on the mobile side (hereinafter, native license information) and the text of the license for a plurality of pieces of OSS used in the web app on the server side (hereinafter, web license information). For the license information, the latest data is saved in advance in the data management unit 412 at the time of installation of the mobile app. The native license information saved in the data management unit 412 is updated as necessary at the time of updating of the mobile app 400. The web license information saved in the data management unit 412 is updated when the user issues an instruction for displaying the license information and the latest license information is acquired from the server 120 via the communication unit 410 under the instruction from the control unit 411. In the present exemplary embodiment, the various data are managed in the form of text file, but the method for managing the data is not limited to this. In addition, the type of data managed is not limited to this.

The screen display unit 413 displays a user interface (UI) screen for accepting user operations on a liquid crystal display unit having the touch panel function of the display and operation unit 220 in the mobile terminal 110. The UI screen here is a screen provided by the server 120 and a screen stored in advance in the mobile app 400.

The server 120 has a request control unit 431 and a data management unit 432, and provides web apps to external apparatuses having accessed the server 120. The request control unit 431 is on standby in a state capable of receiving a request from an external apparatus. Upon receipt of a processing request, the server 120 instructs the data management unit 432 to perform processing as appropriate in accordance with the request. The data management unit 432 saves and manages the screen layout information and the license information of OSS used on the server side. In the event of a change of the OSS used, the license information is also updated. In response to a request from a web browser running on an information processing apparatus such as the mobile terminal 110 connected via the Internet, the data management unit 432 returns the screen layout information or the OSS license information necessary for screen display.

Screen Transition in the Mobile App (Capable of Transmitting and Receiving Information To and From the Server)

Figure 5:
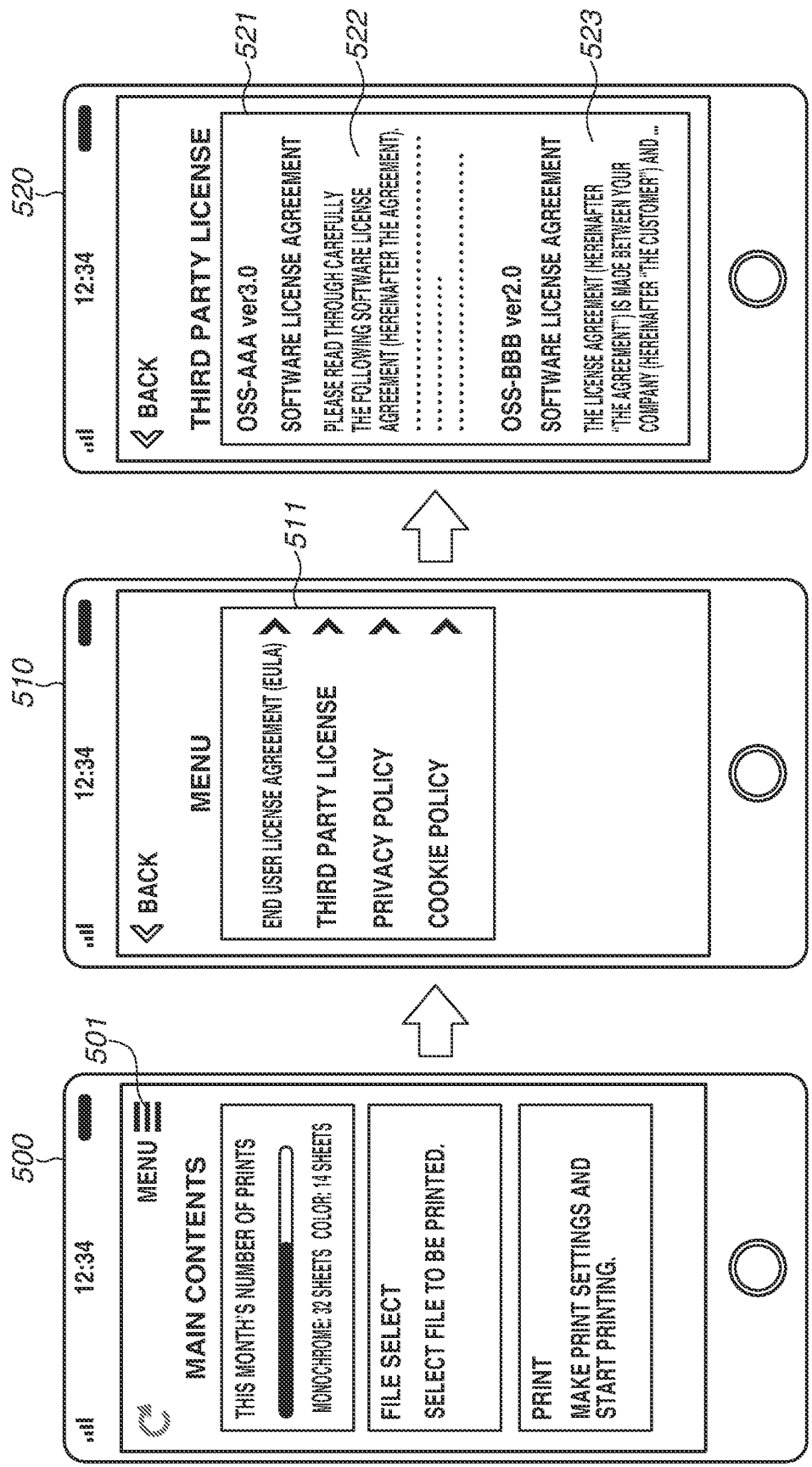
FIG. 5 is a diagram illustrating on-line screen transition of a mobile app.

FIG. 5 is a diagram illustrating an example of screen transition in the mobile app 400 in a state capable of transmitting and receiving information to and from the server 120. The mobile app 400 is an app that instructs a printer (not illustrated) to print an image captured by the camera of the mobile terminal 110 or an image saved in the SSD 214 of the mobile terminal 110 via the screens provided by the server 120. The camera function and the function of accessing a file in the mobile terminal 110 are performed in the native layer, and the display of a screen for the user to issue a print instruction and the execution of the print instruction are performed in the web layer. The mobile app 400 has both the function of a native app and the function of a web app. Thus, it is necessary to display on the mobile app 400 both the license information of OSS used in the native app and the license information of OSS used in the web app.

First, when the mobile app 400 is started, the mobile app 400 acquires from the server 120 the screen layout information necessary for screen display, and displays a web page in the display area of a main screen 500. Then, when a menu button 501 on the main screen 500 is operated, the screen transition to a menu screen 510 takes place. Displayed on the menu screen 510 is a link menu 511 including links to the EULA related to the mobile app 400, the third-party license, and the like. The link to the third-party license is a link for displaying the text of the license for the plurality of pieces of OSS used in the mobile app 400.

Next, when the third-party license in the link menu 511 is pressed, the screen transition to a document screen 520 on which a third-party license 521 is displayed takes place. FIG. 5 illustrates an example where the third-party license is pressed in the link menu 511. However, if another link is pressed, the transition to the screen corresponding to the pressed link takes place. The displayed third-party license 521 includes the text of the license for the plurality of pieces of OSS used in the native app and the web app (native license information 522 and web license information 523). The native license information is saved into the data management unit 412 at the time of installation or updating of the mobile app. The web license information may also be saved into the data management unit 412 at the time of installation of the mobile app. For display of the text of the license, the license information stored in the data management unit 412 is displayed. At this time, if the mobile terminal 110 is on-line and capable of communicating with the server 120, the mobile terminal 110 communicates with the server 120 to acquire the web license information, and displays the acquired web license information together with the pre-saved native license information.

In this way, if the mobile app 400 is communicable with the server 120 at the time of displaying the license information, the mobile app 400 acquires the web license information 523 from the server 120. At this time, the mobile app 400 may save the acquired web license information 523 into the data management unit 412 or may update the web license information saved in the data management unit 412 with the acquired web license information 523. In this way, when the mobile app 400 is communicable with the server 120, the mobile app 400 can display the latest web license information 523.

In general, a native app saves license information therein and updates the saved license information at the time of updating of the app. If the mobile app 400 saves the native license information and the web license information therein as the native app does, the mobile app 400 needs to request the user to update the app with each change of the web license information. The frequency of change of OSS used in the web app is higher than that in the native app, that is, the web license information is frequently changed. Requesting the user to update the app as with the native app will cause inconvenience to the user. Thus, acquiring the web license information from the server when the mobile terminal is on-line makes it possible to avoid unnecessary updating.

In general, a web app saves web license information in a server so that the mobile terminal accesses the server to acquire the license information. If both the native license information and the web license information of the mobile app 400 are saved in the server as in the case of the web app, this will increase the volume of communication data and the amount of processing time necessary for acquirement of the license information. Thus, between the native license information and the web license information, saving the native license information into the mobile app makes it possible to reduce the volume of communication data and the amount of processing time necessary for the acquirement of the license information.

Screen Transition in the Mobile App (Incapable of Transmitting and Receiving Information To and From the Server)

FIG. 6 is a diagram illustrating an example of screen transition in the mobile app 400 in the state incapable of communication with the server 120.

First, when the mobile app 400 is started, the mobile app 400 displays a network connection error screen 600 indicating that the mobile app 400 is off-line.

When a menu button 601 in the network connection error screen 600 is pressed, the screen transition to a menu screen 610 takes place. Displayed on the menu screen 610 is a link menu 611 including links to the EULA related to the mobile app 400 and the third-party license as in the case of the menu screen 510.

Next, when any link in the link menu 611 is pressed, the screen transition to a document screen 620 corresponding to the pressed link takes place. In FIG. 6, the third-party license is pressed in the link menu 611, and then a third-party license 621 is displayed on the document screen 620. The displayed third-party license 621 includes the text of the license (native license information 622 and web license information 623) as in the case of the third-party license 521.

If the mobile app 400 is incapable of communicating with the server 120 such as when the mobile app 400 cannot be connected to the Internet or the mobile app 400 is down, the mobile app 400 displays the license information stored in the control unit 411. That is, the information in the control unit 411 is not updated. If the web license information saved in the control unit 411 has been updated because the license information was displayed on-line in the past by the user as described above, the updated web license information can be displayed.

That is, by saving into the mobile the web license information acquired in a situation where the mobile is communicable with the server, the latest possible information can be displayed even off-line.

For the native license information 522 or 622, the information saved in the data management unit 412 is displayed regardless of network status. If the text of the native license is changed, the mobile app needs to be updated because the change of the text of the native license always involves a change in the configuration of the mobile app. Thus, the text of the native license are changed at the time of updating of the mobile app.

Software Processing and Flowchart in First Exemplary Embodiment

FIG. 7 is a flowchart illustrating details of a process for displaying the text of the license in the mobile app 400. The steps in the flowchart are implemented by the CPU 211 reading and executing control programs stored in the ROM 212 and the SSD 214. The process will now be described in detail.

This process is started by detecting that the menu screen 510 or 610 in the mobile app 400 is displayed.

In step S701, the screen display unit 413 of the mobile app 400 determines whether any link included in the link menu 511 or 611 displayed on the menu screen 510 or 610 has been pressed. If the screen display unit 413 determines that an arbitrary link has been pressed (YES in step S701), the processing proceeds to step S702. If the screen display unit 413 determines that no link has been pressed (NO in step S701), the processing returns to step S701. In the present exemplary embodiment, the arbitrary link is the "third-party license" illustrated in FIG. 5 or 6. However, the selectable information is not limited to this.

In step S702, if the communication unit 410 of the mobile app 400 is communicable with the server 120, the communication unit 410 transmits a request for transmission of the web license information to the server 120.

In step S703, the control unit 411 of the mobile app 400 determines whether the web license information has been acquired as a response to the acquisition request in step S702. If the control unit 411 determines that the web license information has been acquired (YES in step S703), the processing proceeds to step S704. If the control unit 411 determines that the web license information has not been acquired (NO in step S703), the processing proceeds to step S705.

In step S704, the control unit 411 of the mobile app 400 saves into the data management unit 412 the web license information received from the server 120 via the communication unit 410, or updates the information in the data management unit 412 with the web license information received from the server 120. Accordingly, even when the license information of the OSS used in the web app on the server 120 side has been updated, the latest license information can be saved into the data management unit 412. The processing in step S704 does not necessarily need to be executed every time but may be executed only in a case where a predetermined period of time has elapsed since the previous execution or in a case where a save instruction has been issued by the user.

In step S705, the control unit 411 of the mobile app 400 acquires the web license information from the data management unit 412.

In step S706, the control unit 411 of the mobile app 400 acquires the native license information from the data management unit 412.

In step S707, the control unit 411 of the mobile app 400 combines the license information acquired in steps S705 and S706, and displays the combined license information on the screen display unit 413, as the result of the press of the link in step S701 (the link 521 illustrated in FIG. 5 or the link 621 illustrated in FIG. 6).

As described above with reference to the flowchart, at each time the license information is displayed, if the mobile app 400 is communicable with the server 120, the mobile app 400 acquires and displays the web license information from the server 120. On the other hand, as for the license information of the native app, the license information saved in advance in the mobile app (such as at the time of installation of the mobile app) is acquired and displayed. That is, at the time of display of the information of a native app and a web app in a hybrid app, the information about the native app is acquired from the hybrid app, and the information about the web app is acquired from the server each time.

By saving the web license information acquired from the server 120 into the mobile app, the latest possible license information can be displayed in the mobile app even in the off-line environment.

A process for updating the native license information in the mobile app 400 will be described with reference to FIG. 8. FIG. 8 is a flowchart of a process for the mobile terminal 110 to receive an update request of the mobile app 400 and perform the updating. The steps in the flowchart are implemented by the CPU 211 reading and executing the control programs stored in the ROM 212 or the SSD 214.

In step S801, the CPU 211 determines whether an update request of the mobile app 400 has been received. If the CPU 211 determines that the update request has been received (YES in step S801), the processing proceeds to step S802. If the CPU 211 determines that no update request has been received (NO in step S801), the CPU 211 repeats step S801. In step S802, the CPU 211 notifies the user that the mobile app 400 needs updating. In step S803, the CPU 211 determines whether an instruction for determining whether the update instruction of the mobile app 400 has been accepted. If the CPU 211 determines that the instruction has been accepted (YES in step S803), the processing proceeds to S804. If the CPU 211 determines that no instruction has been accepted (NO in step S803), the CPU 211 repeats step S803. In step S804, the CPU 211 updates the mobile app 400. At this time, the native license information saved in the data management unit 412 is updated.

As described above with reference to the flowchart, in a case where the mobile app 400 needs updating, the mobile app 400 can be updated by accepting a user operation. At the time of updating of the mobile app 400, the native license information in the app can be updated. In this example, the mobile app 400 is updated upon acceptance of a user operation. However, if automatic updating is preset, the mobile app 400 can also be automatically updated without acceptance of a user operation. The license information in the app to be updated at the time of updating of the app is not limited to the native license information but the web license information may be updated as well.

According to the above-described exemplary embodiment, when an app having both the function of a native application and the function of a web application receives an instruction for displaying the license information, the app transmits a request for acquiring the license information of the web application, and at the same time, reads the license information of the native application saved in advance in the app. Then, the app displays the license information of the web app acquired as a response to the acquisition request and the read license information of the native app.

Software Processing and Flowchart in Second Exemplary Embodiment

According to the method of displaying the license information described above, when the user instructs the mobile app 400 to display the text of the license from the menu screen, the mobile app 400 acquires the web license information on the server side from the server 120. Thus, there is a drawback that the web license information saved in the data management unit 412 will not be updated unless the user instructs for displaying the license information.

Thus, a method of solving the above-mentioned drawback will be described.

FIG. 9 is a flowchart illustrating in detail an updating process of license information in a mobile app 400 according to a second exemplary embodiment. The steps in the flowchart are implemented by a CPU 211 reading and executing control programs stored in a ROM 212 or an SSD 214. Hereinafter, this process will be described in detail.

This process is started by detecting that the mobile app 400 is running in the background. The process in the flowchart is repeatedly executed at certain time intervals (for example, every day or two) as far as the mobile app 400 is running in the background.

In step S901, a control unit 411 of the mobile app 400 determines whether a background process is possible. If the control unit 411 determines that the background process is possible (YES in step S901), the processing proceeds to step S902. If the control unit 411 determines that the background process is not possible (NO in step S901), the processing returns to step S901.

In step S902, the communication unit 410 of the mobile app 400 transmits a request for acquisition of web license information to the server 120.

In step S903, the control unit 411 of the mobile app 400 determines whether the web license information has been acquired as a response to the acquisition request in step S902. If the control unit 411 determines that the web license information has been acquired (YES in step S903), the processing proceeds to step S904. If the control unit 411 determines that the web license information has not been acquired (NO in step S903), the processing is terminated.

In step S904, the control unit 411 of the mobile app 400 saves the web license information received from the server 120 via the communication unit 410 into the data management unit 412 or updates the information in the data management unit 412 with the web license information received from the server 120.

The method of updating the license information of the mobile app 400 has been described. This allows the web license information in the app to be updated at certain time intervals even in a case where the user has not yet displayed the license information. Accordingly, even off-line, the latest web license information acquired on-line can be displayed.

In the present exemplary embodiment, the case where the mobile app 400 updates the license information at certain time intervals while running in the background has been described as an example. However, the timing for updating is not limited to this. The mobile app 400 may update the web license information each time the mobile app 400 is started up or the server 120 may transmit a notification of necessity for updating the license information to the mobile app 400.

In the above-described exemplary embodiments, the text of the license for OSS has been displayed as an example. However, the contents to be displayed are not limited to the text of the license for OSS. For example, the above-described exemplary embodiments are also applicable to a case of displaying a EULA or the like. Further, the present invention includes systems and their functions configured by combining, as appropriate, the above-described exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-114216, filed Jul. 1, 2020, which is hereby incorporated by reference herein in its entirety.

What is claimed is:

1. A method for an information processing apparatus in which a hybrid application program having a function related to a predetermined service operates, the hybrid application program having both a function of a native application program and a function of a web application program in the function related to the predetermined service, the method comprising:
accepting a predetermined user operation in the hybrid application program;
acquiring first information related to the function of the web application program in the function related to the predetermined service from a server, and acquiring second information related to the function of the native application program in the function related to the predetermined service and saved in advance in the hybrid application program, the first information being license information about the web application program, the second information being license information about the native application program; and
displaying the first information and the second information,
wherein the license information about the web application program is a license term of open source software (OSS) used in the web application program, and the license information about the native application program is a license term of OSS used in the native application program.

2. The method according to claim 1, wherein the predetermined user operation is an instruction for displaying the first information and the second information, on the information processing apparatus.

3. The method according to claim 1, further comprising saving, in the information processing apparatus, the first information acquired as a response to an acquisition request.

4. The method according to claim 3, wherein, in a case where the first information was unable to be acquired as the response to the acquisition request, the saved first information and the second information are acquired and displayed.

5. The method according to claim 3, further comprising:
transmitting the acquisition request for the first information to the server at predetermined time intervals; and
further saving the first information acquired as the response to the transmitted acquisition request.

6. The method according to claim 1, wherein the second information saved in advance in the hybrid application program is updated at a time of updating of the hybrid application program.

7. The method according to claim 1, wherein the information processing apparatus is capable of instructing a printer to print image data saved in the information processing apparatus.

8. The method according to claim 1, wherein an acquisition request for the first information is transmitted to the server.

9. The method according to claim 1, further comprising combining the first information and the second information,
wherein the combined first information and second information is displayed.

10. The method according to claim 1, wherein the function related to the predetermined service is a function related to printing.

11. The method according to claim 1, wherein the first information is information related to the OSS used in the web application program, and the second information is information related to the OSS used in the native application program.

12. An information processing apparatus in which a hybrid application program having a function related to a predetermined service operates, the hybrid application program having both a function of a native application program and a function of a web application program in the function related to the predetermined service, the information processing apparatus comprising:
one or more processors; and
at least one memory storing executable instructions, which when executed by the one or more processors, cause the information processing apparatus to perform operations comprising:
accepting a predetermined user operation in the hybrid application program;
acquiring first information related to the function of the web application program in the function related to the predetermined service from a server, and acquiring second information related to the function of the native application program in the function related to the predetermined service and saved in advance in the hybrid application program, the first information being license information about the web application program, the second information being license information about the native application program; and
displaying the first information and the second information,
wherein the license information about the web application program is a license term of open source software (OSS) used in the web application program, and the license information about the native application program is a license term of OSS used in the native application program.

13. A non-transitory computer-readable storage medium storing a program to cause a computer to perform a method for an information processing apparatus in which a hybrid application program having a function related to a predetermined service operates, the hybrid application program having both a function of a native application program and a function of a web application program in the function related to the predetermined service, the method comprising:
accepting a predetermined user operation in the hybrid application program;
acquiring first information related to the function of the web application program in the function related to the predetermined service from a server, and acquiring second information related to the function of the native application program in the function related to the predetermined service and saved in advance in the hybrid application program, the first information being license information about the web application program, the second information being license information about the native application program; and
displaying the first information and the second information, wherein the license information about the web application program is a license term of open source software (OSS) used in the web application program, and the license information about the native application program is a license term of OSS used in the native application program.

\* \* \* \* \*